United States Patent

[19] Herzer

[11] Patent Number: 6,137,412
[45] Date of Patent: Oct. 24, 2000

[54] MARKER FOR USE IN AN ELECTRONIC ARTICLE SURVEILLANCE SYSTEM

[75] Inventor: Giselher Herzer, Bruchköbel, Germany

[73] Assignee: Vacuumschmelze GmbH, Hanau, Germany

[21] Appl. No.: 09/331,445

[22] PCT Filed: Dec. 19, 1997

[86] PCT No.: PCT/DE97/02980

§ 371 Date: Jun. 21, 1999

§ 102(e) Date: Jun. 21, 1999

[87] PCT Pub. No.: WO98/28639

PCT Pub. Date: Jul. 2, 1998

[30] Foreign Application Priority Data

Dec. 20, 1996 [DE] Germany .......................... 196 53 430

[51] Int. Cl.⁷ .................................................. G08B 13/14
[52] U.S. Cl. ................................... 340/572.6; 340/572.1; 148/121
[58] Field of Search ............................ 340/572.6, 572.1, 340/551; 148/121

[56] References Cited

U.S. PATENT DOCUMENTS

| | | | |
|---|---|---|---|
| 2,705,302 | 3/1955 | Camp et al. | 324/234 |
| 2,828,467 | 3/1958 | Stauffer | 324/222 |
| 5,003,291 | 3/1991 | Strom-Olsen et al. | 340/551 |
| 5,252,144 | 10/1993 | Martis | 148/121 |
| 5,469,140 | 11/1995 | Liu et al. | 340/551 |
| 5,495,231 | 2/1996 | Hasegawa | 340/551 |
| 5,539,380 | 7/1996 | Hasegawa et al. | 340/551 |
| 5,565,849 | 10/1996 | Ho et al. | 340/572.6 |
| 5,568,125 | 10/1996 | Liu et al. | 340/551 |
| 5,628,840 | 5/1997 | Hasegawa | 148/304 |
| 5,676,767 | 10/1997 | Liu et al. | 148/108 |
| 5,684,450 | 11/1997 | Liu et al. | 340/572.1 |

FOREIGN PATENT DOCUMENTS

| | | |
|---|---|---|
| 0 316 811 | 5/1989 | European Pat. Off. . |
| 0 592 780 | 4/1994 | European Pat. Off. . |
| 0 690 425 | 1/1996 | European Pat. Off. . |
| 0 729 122 | 8/1996 | European Pat. Off. . |
| 0 737 986 | 10/1996 | European Pat. Off. . |
| 9412456 | 8/1994 | Germany . |
| WO 88/01427 | 2/1988 | WIPO . |
| WO 90/03652 | 4/1990 | WIPO . |

Primary Examiner—Benjamin C. Lee
Attorney, Agent, or Firm—Hill & Simpson

[57] ABSTRACT

A marker for employment in a magnetic merchandise monitoring system is composed of one or more oblong, ductile, magnetostrictive strips composed of amorphous ferromagnetic material. These strips experience a change in resonant frequency due to a change of a pre-magnetization field and are excited to longitudinal, mechanical resonant oscillation at the resonant frequency $f_r$ due to an alternating magnetic field, whereby the mechanical stresses resulting from the resonant oscillations cause a change in magnetization of the strips and, thus, a detectable change of the alternating magnetic field. The material of which the strips are composed exhibits a flat B-H loop that proceeds optimally linearly into the range of saturation; further, the strips exhibit a magnetic anisotropy transverse to the longitudinal strip direction, whereby the anisotropy field strength is greater than the pre-magnetization field strength. The strips experience a change of the resonant frequency compared to the change of the pre-magnetization field strength of $df_r/dH_{Bias} \geq 1500$ Hz/Oe and thereby exhibit the resonator quality $Q \geq 100$ in a field range $dH_{Bias} \geq 1$ Oe.

8 Claims, 4 Drawing Sheets

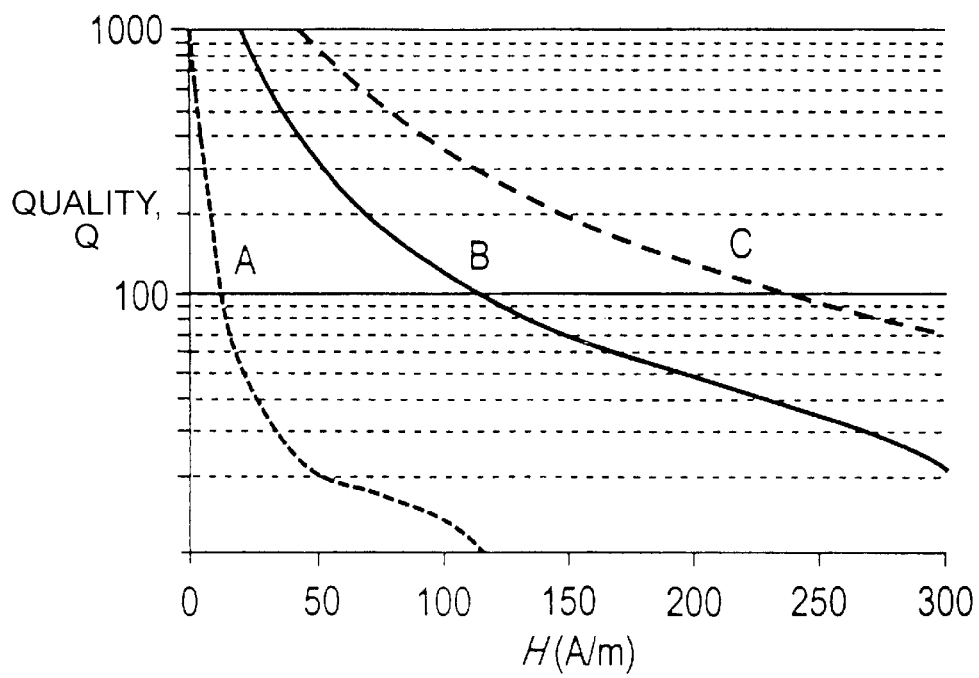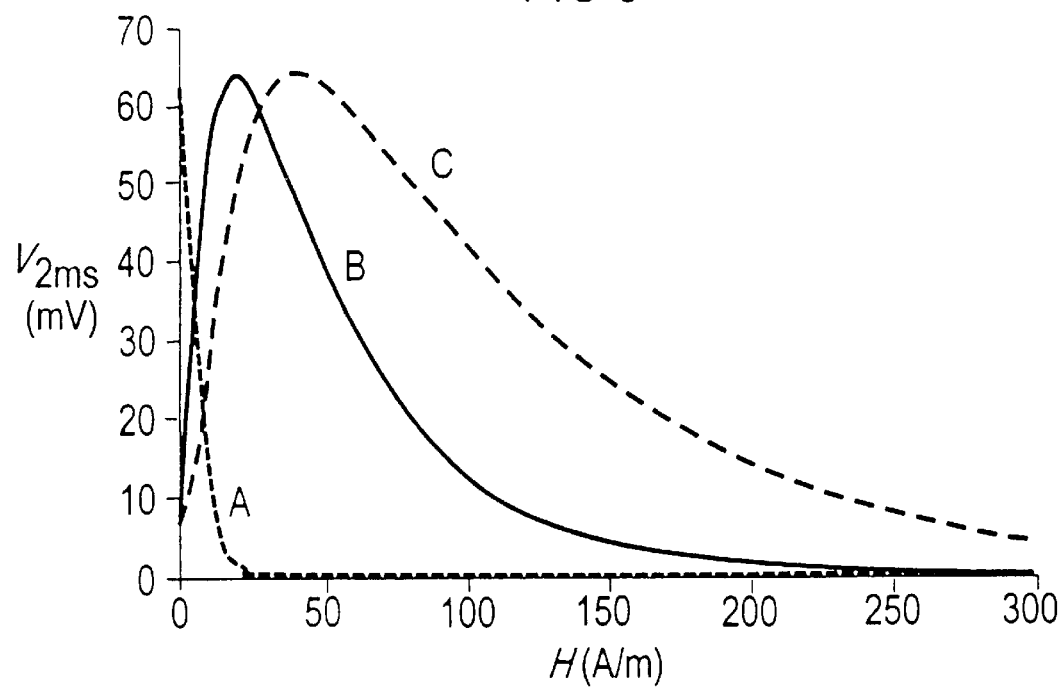

MARKER FOR USE IN AN ELECTRONIC ARTICLE SURVEILLANCE SYSTEM

BACKGROUND OF THE INVENTION

1. Field of the Invention

The present invention is directed to a marker for employment in a electronic article surveillance system, the marker being of the type composed of one or more oblong, ductile magnetostrictive strips composed of amorphous ferromagnetic material that experience a change of the resonant frequency due to a change of the pre-magnetization field and that can be excited to longitudinal, mechanical resonant oscillations at the resonant frequency $f_r$ by a magnetic alternating field, whereby the mechanical stresses resulting from the resonant oscillations cause a change of the magnetization of the strips and, thus, a detectable modification of the alternating magnetic field.

2. Description of the Prior Art

When a strip of amorphous magnetostrictive material is exposed to a magnetic field, then the magnetostriction causes a change in length of the strip. Given positive magnetostriction, the strip will lengthen with increasing magnetic field. This dependency, however, is not linear but is dependent on the dimensions of the strip and on the size of the magnetic field. When the magnetic field is increased step-by-step by the respectively same amount at a specific strip, then it can be found that only small length changes initially ensue, that the length changes become greater with increasing steps for the increase of the magnetization, and that no further length change ensues given the occurrence of saturation despite continuing to increase the magnetic field step-by-step.

This property allows such a strip to be excited to mechanically oscillate when it is exposed to a pre-magnetization field whose size results in a great length change given the same modification of the magnetic field. Further, the length change ensuing due to the magnetic field causes the length of the strip to change in this area without having a tensile force act on the strip.

The modulus of elasticity of the material is the critical factor for the resonant frequency of the oscillation in the mechanical oscillation of a strip. The force required for a specific length change is all the greater and the resonant frequency of the oscillating strip becomes all the higher the higher this modulus of elasticity is. However, an additional length change ensues due to the influence of the magnetic field without requiring a force. The material thus acts as though it had a modulus of elasticity lower than the mechanical modulus of elasticity.

This results in the resonant frequency becoming lower than it is without pre-magnetization of the strip given increasing pre-magnetization with excitation of mechanical oscillations by a magnetic alternating field. A strip that oscillates with high signal amplitude at a given pre-magnetization with a specific resonant frequency will oscillate significantly less given excitation with the same frequency when the pre-magnetization field is removed, since the resonant frequency thereby increases and the exciting frequency and the resonant frequency no longer coincide.

Moreover, the effect of the removal of the pre-magnetization field is that a modification of the magnetic field only results in relatively slight modifications in the length of the strip, so that the signal height significantly decreases without pre-magnetization field.

Together, the two factors result therein that a mechanical oscillation of the strip is suppressed given removal of the pre-magnetization field. It is thus possible to deactivate a marker of this material in that the pre-magnetization field is removed.

This is achieved in markers, for example, having a semi-hard magnetic, further strip connected to the soft magnetic strip is demagnetized. Given other systems wherein the pre-magnetization field is co-generated by a coil in the examination region, the oscillation can be suppressed in that this pre-magnetization field is turned off.

PCT Application WO 88/01427 discloses a merchandise security system operating on a magneto-elastic basis which can detect not only whether one or more activated markers are present in the security area, but also, detect the number of activated display elements and/or their identity in the security area. PCT Application WO 88/01427 further discloses that the identification given the employment of magneto-elastic markers is essentially based on the presence of a number of resonant frequencies in the security area is interrogated. Since only the projection of the external field onto the longitudinal strip axis is effective in the display elements themselves, this makes it possible to detect the different strip orientations. For example, the individual objects can be individually identified and spatially resolved as well as a result on the basis of different strip orientations within a display element.

PCT Applications WO 90/03652 also discloses alloys having high magnetostriction that, in addition to containing iron, essentially contain nickel, and these are proposed for display elements of the species initially cited. These alloys, however, do not exhibit great changes of the resonant frequency with the pre-magnetized field and also do not simultaneously have a high signal amplitude and a good resonator quality. Markers that are provided with strips of such alloys exhibit only a short post-pulse oscillation of the signal after the deactivation of the external excitation, so that their detectability if greatly limited.

U.S. Pat. No. 5,495,231 also discloses markers for employment in a magnetic merchandise monitoring system that are composed of one or more oblong, ductile, magnetostrictive strips composed of amorphous ferromagnetic material that experience a resonant frequency change $df_r/dH_{Bias}$ due to change of a pre-magnetization field $H_{Bias}$, and which can be excited by an alternating magnetic field to mechanical resonant oscillations at the resonant frequency $f_r$, whereby the mechanical stresses resulting from the resonant oscillations effect a change in the magnetization of the strip and, thus, a detectable modification of the alternating magnetic field. The alloys proposed therein exhibit a flat B-H loop that proceeds optimally linearly up into the region of saturation, whereby a strip of the material exhibits a magnetic anisotropy transverse to the longitudinal trip direction and the anisotropy field strength $H_{aniso}$ is higher than the pre-magnetization field strength $H_{Bias}$.

SUMMARY OF THE INVENTION

It is therefore an object of the present invention to improve markers of the above type to achieve a high signal amplitude and a long persistence of the signal after deactivation of the exciting field, a low dependency of the resonant frequency on the pre-magnetizing field strength as well as—at the same time—a dependable deactivation possibility of the strip are present, and a high resonator quality.

This object is inventively achieved in that the changes of the resonant frequency of the strip compared to the change in the pre-magnetization field strength is [sic] dfr/ $dH_{Bias} \geq 1500$ Hz/Oe, preferably $dfr/dH_{Bias} \geq 2000$ Hz/Oe, and the strips thereby exhibit the resonant quality $Q \geq 100$ in a field range $dH_{Bias} \geq 1$ Oe or 80 A/m.

By employing such display elements, a very pronounced change of the resonant frequency with the pre-magnetizing field is assured, as is a simultaneously high signal amplitude and good resonator quality, i.e. a very long post-pulse oscillation of the signal after deactivation of the external excitation, among other things.

Moreover, the employment of such materials exhibits further great advantages that are described in detail below.

DESCRIPTION OF THE DRAWINGS

FIG. 5 shows the resonator quality Q dependent on the pre-magnetization field H for the marker strips shown in FIG. 1.

FIG. 6 shows the resonant amplitude 2 msec after deactivation of the exciting alternating field, as a function of the pre-magnetizing constant field for the marker strips shown in FIG. 1.

DESCRIPTION OF THE PREFERRED EMBODIMENTS

Figure 3:
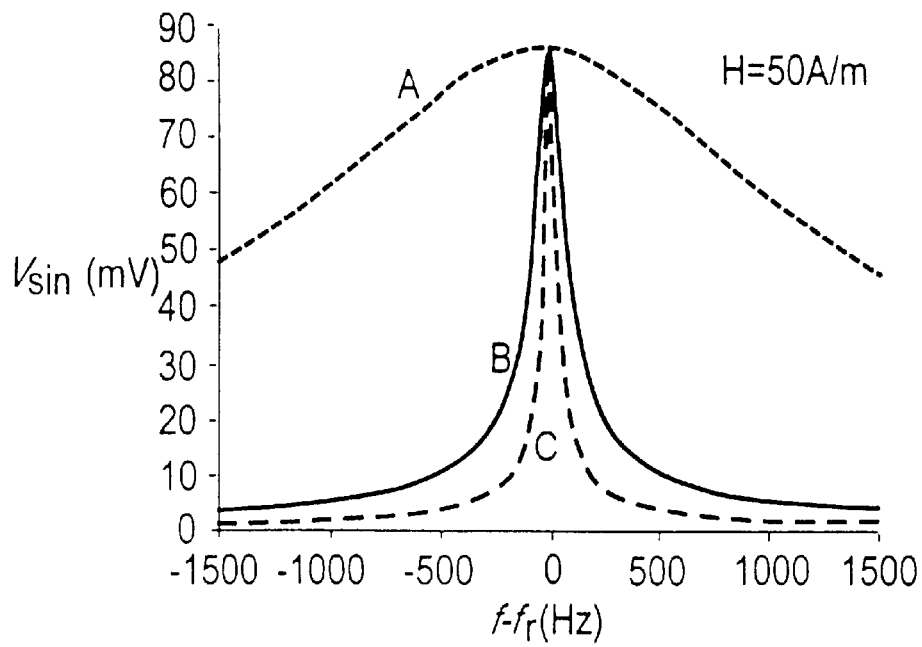
FIG. 3 illustrates the resonant behavior of the signal amplitude for the marker strips shown in FIG. 1.

One or more ferromagnetic, magnetostrictive strips that are excited to execute longitudinal, mechanical resonant oscillations by a magnetic alternating field are the core of a marker. Due to the magnetostrictive coupling, the mechanical stresses linked with the oscillation effect a change in magnetization that induces a corresponding voltage in the receiver coil, the marker being thus capable of being detected. FIG. 3 thereby illustrates the resonant-like super-elevation of the induced voltage as a function of the frequency of the exciting alternating field.

In addition to the signal amplification due to resonant super-elevation, a further, critical advantage of these magneto elastic merchandise protection systems is that the mechanical oscillation and, linked therewith, the induced voltage remains even after the deactivation of the external excitation.

The signal typically lasts a few msec. FIG. 6 shows a schematic illustration of this behavior. This is a more or less unique feature and reduces possible false alarms due, for example, to shopping carts and other magnetic articles to an absolute minimum. Since the exciting magnetic field likewise induces a voltage in the receiver coils, it is also clear that the sensitivity of the system is enhanced when this noise background is eliminated.

These properties are produced magnetostrictive alloys on an iron basis with nickel and/or cobalt additives that are thermally treated such in a magnetic field that a uni-axial magnetic anisotropy derives transversely relative to the longitudinal tape direction. A continuous ribbon is typically cast from the melt by rapid quenching and is subsequently subjected to a thermal treatment transversely relative to the tape direction (transverse field) in a magnetic field and the strips for the markers are then cut to length.

The thermal treatment is preferably accomplished in continuous operation and the throughput speed is selected such that the tape is heated to a temperature of 300° C.$\leq T \leq$440° C. for a thermal treatment time of 0.5 sec$\leq T \leq$30 sec.

The magneto elastic properties to be anticipated were examined below for 3 exemplary alloys having different anisotropy field strengths. The alloys on which these were based and the primary material parameters are compiled in Tables 1 and 2.

TABLE 1

Material parameters for the three exemplary cases investigated.
The typical thermal treatment for setting the indicated anisotropy field lay at approximately a few seconds in the temperature range between 300° C. and 400° C.

| Case | Alloy (at %) | $J_S$ (T) | $\lambda_s$ (ppm) | $E_s$ (GPa) | $H_{K\,(A/m)}$ |
|------|--------------|-----------|-------------------|-------------|----------------|
| A | $Fe_{81}Si_{3.5}B_{13.5}C_2$ | 1.58 | 35.6 | 183 | 146 |
| B | $Fe_{62}Ni_{20}Si_2B_{16}$ | 1.44 | 32.5 | 169 | 360 |
| C | $Fe_{62}Ni_{20}Si_2B_{16}$ | 1.44 | 32.5 | 169 | 510 |

TABLE 2

Specimen dimensions and excitation conditions for the exemplary cases investigated.

| | |
|---|---|
| Strip length: | 60 mm |
| Ribbon width: | 2 mm |
| Ribbon thickness: | 25 μm |
| Alternating field: | $H_{ac}$ = 1 A/m |
| Pick-Up Coil: | 100 turns |

Figure 1:
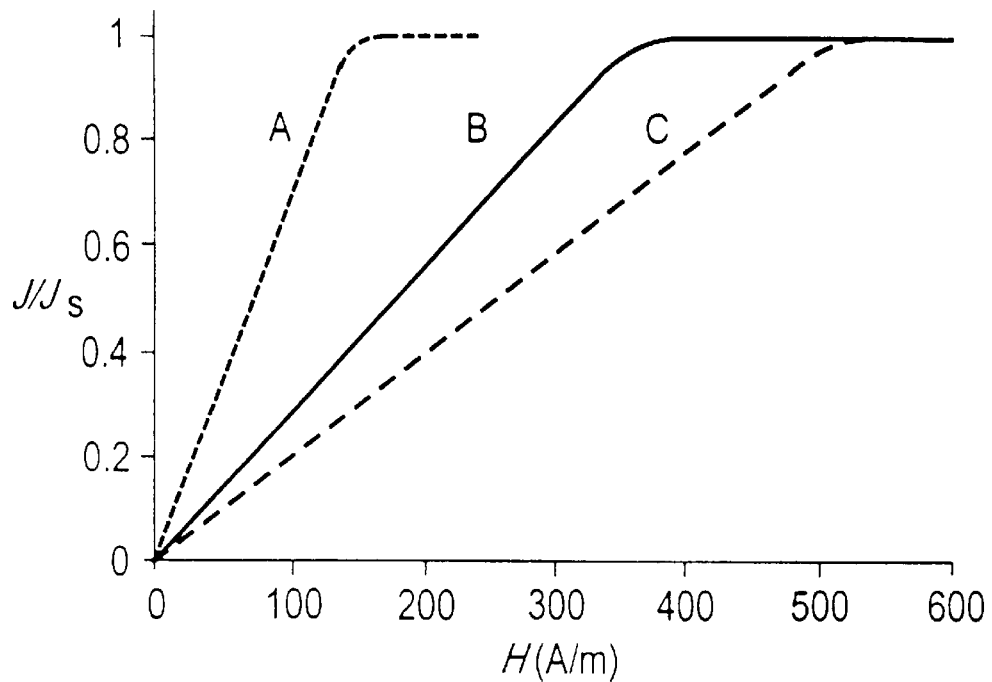
FIG. 1 shows B-H curves for marker strips in accordance with the invention.
Figure 2:
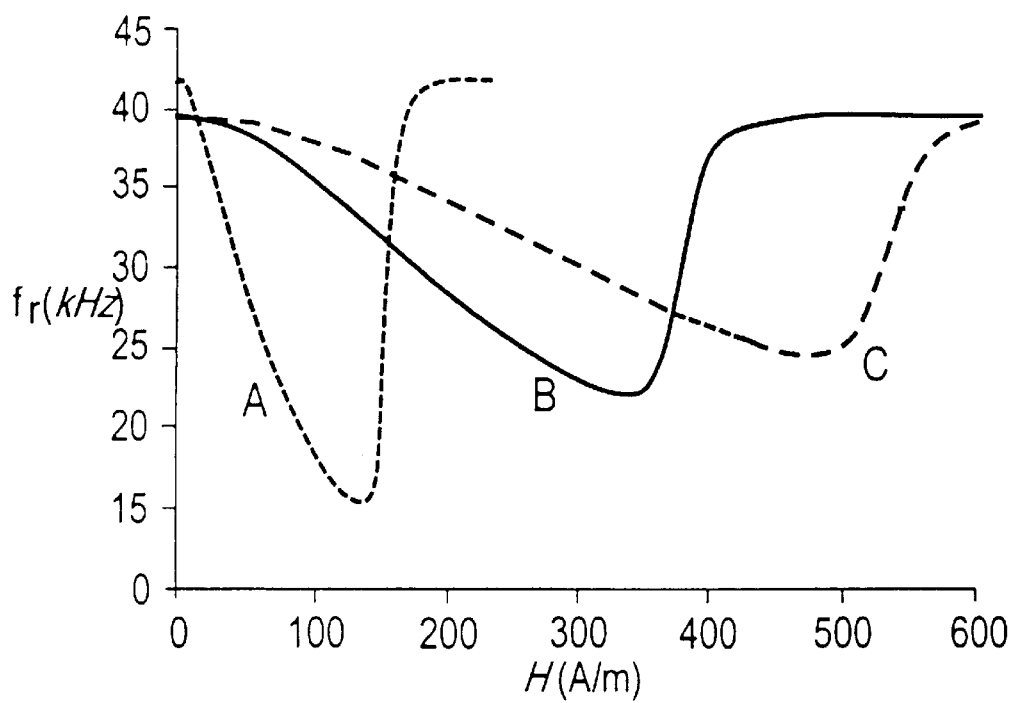
FIG. 2 shows curves for the resonant frequency $f_r$ as a function of the pre-magnetizing field H, for the marker strips shown in FIG. 1.

FIG. 1 shows the typical B-H loops that arise after the thermal treatment. FIG. 2 shows the curve of the resonant frequency as function of the external, pre-magnetizing field. The greatest changes of the resonant frequency arise due to the small anisotropy field in Example A that therefore best meets the above-discussed demands. The alloy $Fe_{81}$ $Si_{3.5}$ $B_{13.5}$ $C_2$, due to the properties shown in FIG. 2, is also especially advantageous for magneto elastic applications.

Figure 4:
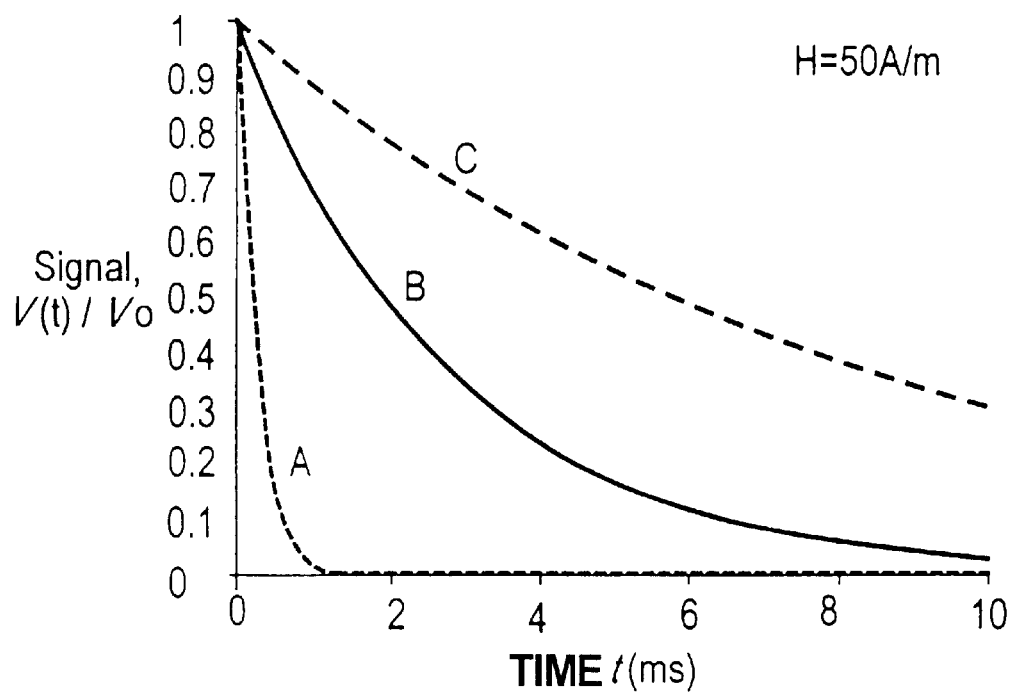
FIG. 4 shows the time curve of the resonant amplitude after deactivation of the alternating field excitation for the marker strips shown in FIG. 1.

Since, however, a small anisotropy field and a great modification of the effective modulus of elasticity with the pre-magnetization (ΔE-Effect) also causes a great damping of the mechanical oscillation, an extremely great half width of the resonant curve derives, which can be seen in FIG. 3 or, respectively, a very rapid decay of the resonant amplitude occurs after deactivation of the exciting alternating field, which is shown in FIG. 4. Both effects are disadvantageous.

The great half-width value $\Delta f_r$ of the resonant curve makes the resolution of the exact resonant frequency more difficult. When one has a number of strips with different resonant frequency, then the individual resonant frequencies of the individual strips must lie far apart given high values of $\Delta f_r$ in order to be able to reliably distinguish between the strips. Of course, the number of encoding possibilities is thus reduced compared to an arrangement of strips with $\Delta f_r$, i.e. high resonator quality Q. These two latter quantities are related via $$\Delta f_r = f_r/Q$$

These relationships can be derived from the book by R. M. Bozorth, Ferromagnestism, Van Nostrant, Princeton, 1951, pages 699ff.

The rapid decay of the signal amplitude after deactivation of the exciting field makes the reliable detection of the strip more difficult. The decay time τ after which the signal has decayed to $1/e^{th}$ of its original value is linked to the resonator quality via the relationship $$Q = \pi f_r \tau$$

Following for the resonant amplitude as function of the time is $$V(t) \sim Q\{1 - f_r(H)/f_r(0)\}^2\} \exp(-\pi f_r t/Q).$$

FIG. 5 shows the resonator quality Q of the investigated examples as a function of the pre-magnetizing field. Whereas the resonator quality Q, apart from very low field strength, is very small in case A, the two other examples exhibit significantly better qualities and therefore meet the second demand of the application significantly better.

This, of course, is also expressed in the resonant amplitude, particularly after deactivation of the external, exciting field. In case A, thus, a reasonable, detectable signal arises only in a very small range of the pre-magnetizing field, whereas a high signal amplitude derives over a broad field range in cases B and C.

Figure 7:
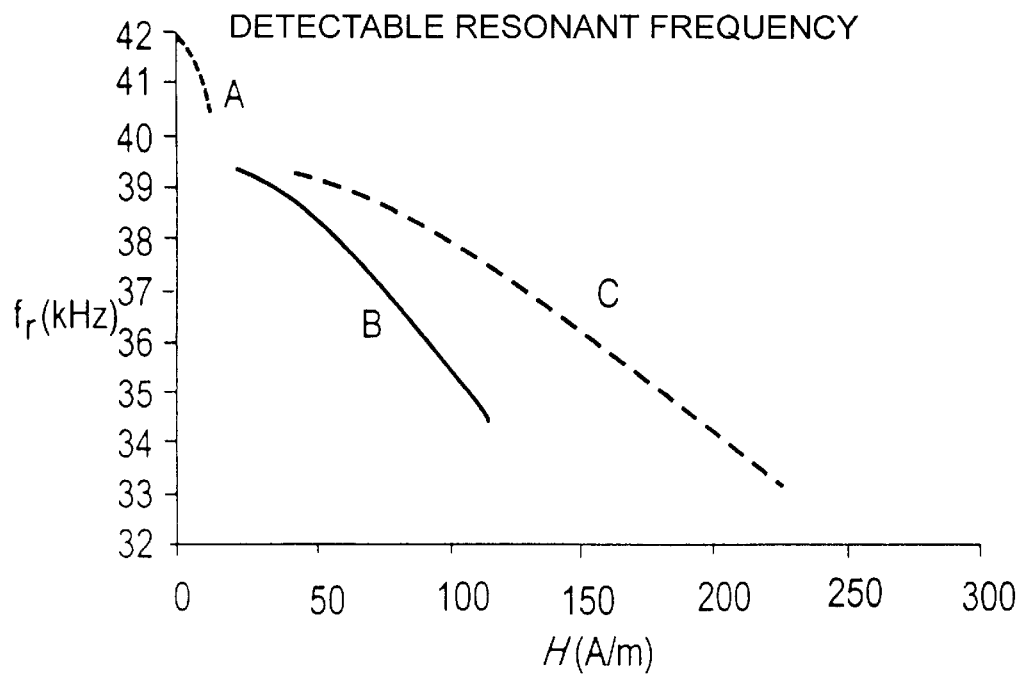
FIG. 7 shows the variation of the resonant frequency as a function of the pre-magnetizing constant field for the marker strips shown in FIG. 1.

It is thus clear that only those resonant frequencies can be detected well at which the signal amplitude or, the resonator quality is adequately high. Only those resonant frequencies at which this is the case are thus entered in FIG. 7. The selection criterion was thereby established that the resonator quality $Q \geq 100$ applies or, respectively, the signal amplitude should not drop by more than 50% below its maximum value 2 msec after deactivation of the alternating field excitation. These two latter demands are roughly equivalent except given extremely low pre-magnetization field strengths where no reasonable magneto-elastic coupling can occur any more due to too low a ΔE effect.

Figure 8:
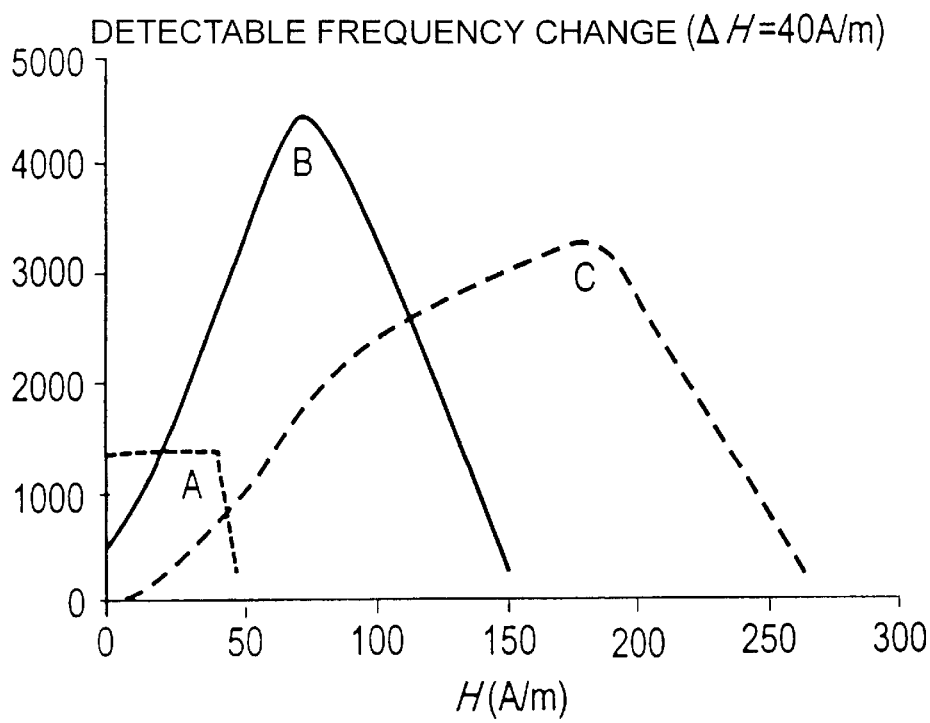
FIG. 8 shows the change of the resonant frequency after the pre-magnetizing field H is modulated with a low-frequency alternating field having the strength $\Delta H_{Bias}=40$ A/m.

A further demand is that said frequency modification should be produced by optimally small field strength changes. Accordingly, FIG. 8 shows a frequency change when the pre-magnetizing constant field is modulated with a low-frequency alternating field ΔH. Given the condition selected here, Example B thus exhibits the greatest change of frequency.

The entire pre-magnetizing field need not be produced by the coils but only the modulation field ΔH. The static basic part of the pre-magnetizing field is expediently produced by a magnetized, hard-magnetic strip in order to proceed into the maximum of the frequency change (FIG. 8).

The advantageous resonator properties that have been shown are mainly set by the selection of the alloy composition and of the thermal treatment that ensued at the alloy. What is critical for the desired properties, of course, is a high magnetostriction $\lambda_S \sim 20$ through $50 \times 10^{-6}$ and a well-defined value of the anisotropy field strength $H_K$. A range of $H_K \sim 200$ through 800 A/m has proven advantageous for the selection of the anisotropy field strength.

The tape dimensions employed in the examples, i.e. strip lengths of approximately 60 mm, tape widths of approximately 2 mm, are likewise advantageous for employment of display elements in merchandise protection systems of the type initially described. Particularly when one wishes to evaluate the angular orientation of the strips, an optimally high ratio of strip length to tape width is more beneficial than a low ratio.

The alloy compositions, i.e. the exact composition of suitable amorphous ferromagnetic, iron-based alloys, are [sic] disclosed in detail in German Utility Model 94 12 456 and in European Patent Application 0702096 corresponding thereto, the teachings of which are incorporated herein by reference.

Although modifications and changes may be suggested by those skilled in the art, it is the intension of the inventor to embody within the patent warranted hereon all changes and modifications as reasonably and properly come within the scope of his contribution to the art.

What is claimed is:

1. A marker for a magnetic electronic article surveillance system, comprising at least one oblong, ductile, magnetostrictive strip composed of an amorphous ferromagnetic material that exhibits a change in resonant frequency $df_r/dH_{Bias}$ due to variation of a pre-magnetization field $H_{Bias}$, and which is excitable to longitudinal, mechanical resonant oscillations at the resonant frequency $f_r$ by an alternating magnetic field, with mechanical stresses resulting from the resonant oscillations causing a change in magnetization of the strip and a detectable variation of the alternating magnetic field, said strip of the amorphous ferromagnetic material exhibiting a flat B-H loop that proceeds linearly into a range of saturation, said strip of the amorphous ferromagnetic material exhibiting a magnetic anisotropy at a right angle to a longitudinal strip direction, with an anisotropy field strength $H_{aniso}$ that is greater than the pre-magnetization field strength $H_{Bias}$ said strip exhibiting a change of the resonant frequency compared to a change of the pre-magnetization field strength $df_r/dH_{Bias} \geq 1500$ Hz/Oe and a resonator quality $Q \geq 100$ in a field range $dH_{Bias} \geq 80$ A/m.

2. A marker according to claim 1, wherein the amorphous ferromagnetic material exhibits a saturation magnetostriction 20 ppm $\geq \lambda_s \leq 40$ ppm and an anisotropy field strength 200 A/m $\leq H_{aniso} \leq 800$ A/m.

3. A marker according to claim 1 wherein the amorphous ferromagnetic material has a composition having the formula

$$Fe_a Co_b Ni_c Si_d B_e M_f$$

wherein M is at least one element of at least one of the groups $III_A$ through $V_A$ and of the periodic table $III_B$ through $V_B$ of the periodic table, and wherein a through f are in atomic % and wherein $20 \leq a \leq 74$, $1 \leq b \leq 8$, $1 \leq c \leq 50$, $0 \leq d \leq 10$, $e \leq 20$, $0 \leq f \leq 5$, with $a+b+c<88$ and $12 \leq d+e+f \leq 21$.

4. A method for manufacturing a marker for use in an electronic article surveillance system, comprising the steps of:

(a) producing a melt of a ferromagnetic alloy with a composition having the formula $Fe_a Co_b Ni_c Si_d B_e M_f$ wherein M is at least one element of at least one of the groups $III_A$ through $V_A$ and $III_B$ through $V_B$ of the periodic table, and wherein a through f are in atomic % and wherein $20 \leq a \leq 74$, $1 \leq b \leq 8$, $1 \leq c \leq 50$, $0 \leq d \leq 10$, $e \leq 20$, $0 \leq f \leq 5$, with $a+b+c<88$ and $12 \leq d+e+f \leq 21$;

(b) casting a continuous amorphous ferromagnetic ribbon, having a ribbon plane and a longitudinal axis, from said melt;

(c) thermally treating said ribbon in a magnetic field oriented in said ribbon plane and transverse to said longitudinal axis, to produce a thermally treated ribbon; and (d) cutting a plurality of oblong, ductile magnetorestrictive strips from said thermally treated ribbon, each strip exhibiting a change in resonant frequency $df_r/dH_{Bias}$ due to variation of a pre-magnetization field $H_{Bias}$, and being excitable to longitudinal, mechanical resonant oscillations at the resonant frequency $f_r$ by an alternating magnetic field, with mechanical stresses resulting from the resonant oscillations causing a change in magnetization of each strip and a detectable variation of the alternating magnetic field, each strip further exhibiting a flat B-H loop that proceeds linearly into a range of saturation, each strip further exhibiting a magnetic anisotropy at a right angle to said longitudinal axis with an anisotropy field strength $H_{aniso}$ that is greater than said premagnetization field strength $H_{Bias}$, and each strip exhibiting a change of the resonant frequency compared to a change of the premagnetization field strength $df_r/dH_{Bias} \geq 1500$ Hz/Oe and a resonator quality $Q \geq 100$ in a field range of $dH_{Bias} \geq 80$ A/m.

5. A method as claimed in claim 4 wherein step (c) comprises continuously passing said ribbon through an annealing oven.

6. A method as claimed in claim 5 wherein step (c) comprises continuously passing said ribbon through an annealing oven at a throughput speed to heat said ribbon to a temperature T of 300° C.$\leq$T$\leq$440° C. for a time t of 0.5 sec$\leq$t$\leq$30 sec.

7. A method as claimed in claim 6 wherein step (c) further comprises:

measuring a B-H loop of said continuous ribbon while said continuous ribbon is being thermally treated and controlling at least one of T, t and said throughput speed dependent on said B-H loop of said continuous ribbon while said continuous ribbon is being thermally treated.

8. A method as claimed in claim 4 wherein said continuous amorphous ferromagnetic ribbon is cast with a ribbon width, and wherein said strips are cut from said continuous ribbon so as to also have said width, and wherein step (a) comprises selecting the composition of said ferromagnetic alloy dependent on said width.

* * * * *